Feb. 5, 1952 W. J. HAJEK 2,584,445
TEMPERATURE CONTROLLER FOR AIR-CONDITIONING SYSTEMS
Filed Feb. 16, 1948
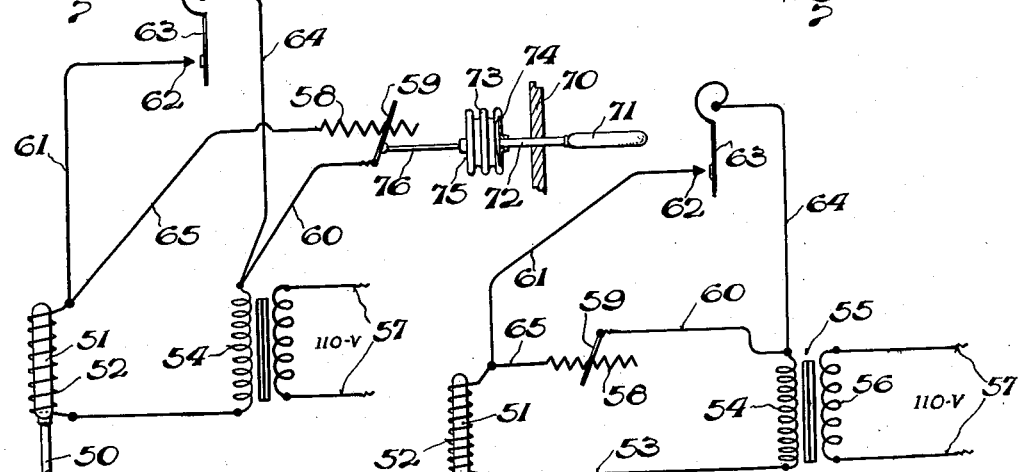
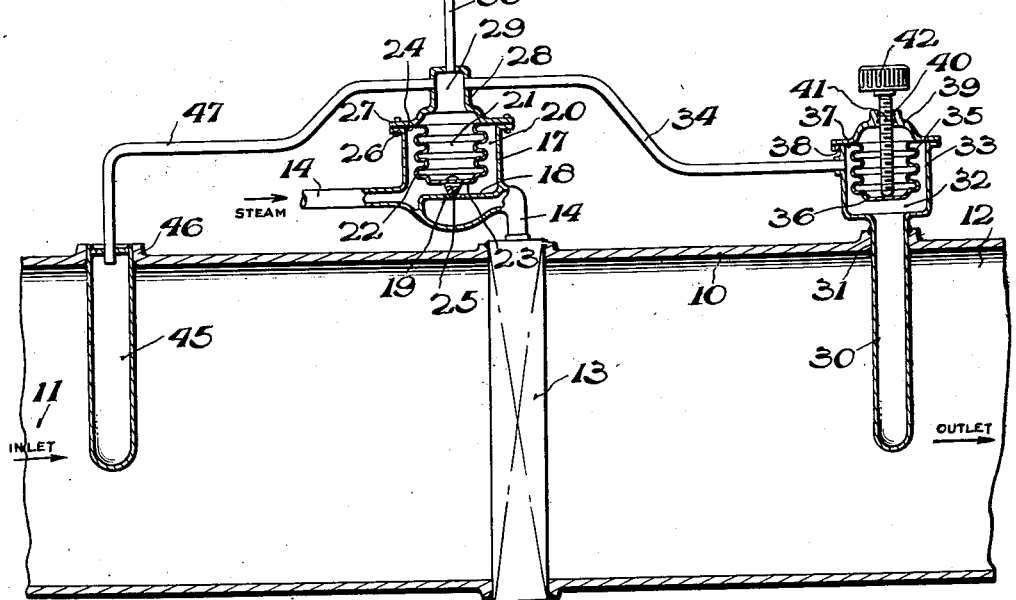
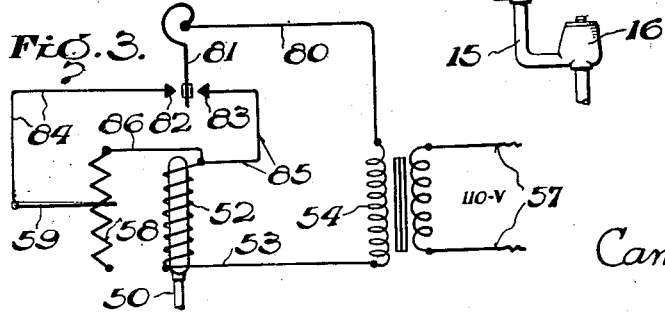
INVENTOR.
William J. Hajek.
BY
Cameron, Kerkam + Sutton
Attorneys Patented Feb. 5, 1952

2,584,445

UNITED STATES PATENT OFFICE 2,584,445

TEMPERATURE CONTROLLER FOR AIR-CONDITIONING SYSTEMS

William J. Hajek, Knoxville, Tenn., assignor to Robertshaw-Fulton Controls Company, Knoxville, Tenn., a corporation of Delaware Application February 16, 1948, Serial No. 8,616

8 Claims. (Cl. 236—37)

This invention relates to temperature controllers and more particularly to temperature controllers for predetermining the temperature to be maintained by air preheated in a duct or ducts and delivered therefrom to a space to be conditioned.

It is an object of this invention to provide an improved temperature regulator of the type referred to for predetermining the relationship to be maintained between the temperature of the space to be conditioned and the temperature of the air to be supplied thereto.

Another object of this invention is to provide an improved device of the type just characterized which discontinues the operation of the heating means upon the occurrence of a predetermined maximum temperature in said space.

Another object of this invention is to provide an imporved device of the type characterized with readily settable means for predetermining the relationship to be maintained.

Another object of this invention is to provide an improved device of the type last characterized wherein the settable means may be automatically adjusted by variations in temperature, for example outdoor temperature.

Another object of this invention is to provide an improved device as so far characterized which includes a simple electrical system for predetermining the relationship to be maintained between the temperatures in the space to be conditioned and the temperature of the air being supplied thereto.

Another object of this invention is to provide an improved device as so far characterized which is composed of simple parts that are inexpensive to produce, easy to install, durable in operation, and efficient and certain in maintaining the desired temperature relationships.

Other objects will appear as the description of the invention proceeds.

The invention is capable of receiving a variety of expressions three of which have been illustrated on the accompanying drawings, but it is to be expressly understood that the drawings are for purposes of illustration only and are not to be construed as definitions of the limits of the invention, reference being had to the appended claims for that purpose.

Referring in detail to the accompanying drawings, wherein the same reference characters are employed to designate corresponding parts in the several figures, Fig. 1 is a schematic elevation of one embodiment of the present invention;

Fig. 2 is a partial diagram corresponding in part to Fig. 1 but illustrating an automatic adjustment of the variable resistance, as from outdoor temperatures; and Fig. 3 is a partial diagram illustrating the use of a double-throw snap-action switch in the circuit.

In the form shown in Fig. 1, 10 designates any suitable air duct through which air may be supplied to any suitable space to be conditioned, 11 designating the inlet end and 12 designating the outlet end of said duct. Disposed in said duct is any suitable heat exchanger 13 supplied with any suitable heating medium, such as steam, through an inlet pipe 14, the condensate flowing out of said heat exchanger through pipe 15 and trap 16.

Interposed in the inlet pipe 14 is a valve mechanism for controlling the flow of heating medium to the heat exchanger 13, said heating medium being hereinafter assumed to be steam. Said valve mechanism may be of any suitable construction, being here shown as including a housing 17 having interiorly thereof a partition 18 in which is disposed a suitable valve port 19. Housing 17 provides a chamber 20 on the inlet side of the valve port 19, and disposed in said chamber is an expansible and collapsible chamber 21, here shown as in the form of a corrugated expansible and collapsible tubular wall or bellows 22 having a movable end wall 23, integrally connected therewith or suitably attached thereto, and at its opposite end an outwardly extending flange 24 integral therewith or suitably attached thereto. A valve member 25 of any suitable construction is mounted on or suitably attached to movable end wall 23 in position to control the port 19. Flange 24 provides a mounting means for the chamber 21, being shown as clamped between a flange 26 on the housing 17 and a flange 27 on a bonnet member 28 which provides internally thereof a chamber 29 in open communication with the chamber 21 and here shown as providing an extension thereof.

Mounted in the duct 10 on the outlet side of the heat exchanger 13 is a temperature regulating device provided primarily for the purpose of predetermining the minimum temperature of the air flowing through the outlet of the duct. As here shown, a bulb 30 of any suitable size and construction is mounted in any appropriate way in an aperture 31 in the wall of said duct and projects into the duct to a position where it is in heat interchanging relationship with the heated air flowing to the outlet. Where as preferred a provision is made for varying the minimum temperature to be maintained, bulb 30 communicates at its outer end with a chamber 32 formed interiorly of a suitable housing member 33. Communicating with said chamber 32 is a conduit 34 of any suitable length, size and construction having its opposite end in communication with the aforesaid chamber 29. Chamber 32 is made expansible and collapsible, and to this end an expansible and collapsible corrugated tubular wall or bellows 35 is mounted within said chamber 32, said bellows having a movable end wall 36 integral therewith or suitably attached thereto and at its opposite end an outwardly extending flange 37 by which it is shown as clamped in position between flanges 38 on said housing member 33 and a cover member 39. Cover member 39 preferably carries any suitable means for adjusting the length of the bellows to vary the volume of the chamber 32. As shown, cover member 39 is provided with a threaded aperture 40 in which is mounted a threaded stem 41 that projects into the bellows 35 to contact the movable end wall 36. Exteriorly of the cover member 39 threaded stem 41 has a manual operating member, as a knurled knob 42. If desired, knob 42 may be provided with any suitable pointer for cooperating with appropriate indicia on the cover member 39. Bellows 35 by reason of its inherent resiliency, or if preferred by reason of a spring associated therewith, maintains its movable end wall 36 in engagement with the end of the threaded stem 41 when said stem is threaded outwardly to effect a contraction of the bellows 35 and increase the volume of the chamber 32, inward threading of said stem 41 expanding said bellows 35 and decreasing the volume of said chamber 32. The interiors of bulb 30, chamber 32 and conduit 34 are charged with a suitable vaporizable liquid which will be evaporated at the temperature of the steam in the chamber 20 when injected from conduit 34 through chamber 29 into chamber 21, thereby to develop pressure in chamber 21 that will expand said chamber and move valve member 25 toward its port 19, although other heating means may be provided for the chamber 21 if preferred.

Assuming air to be flowing through the duct 10 and steam to be flowing through the heat exchanger 13, if there is a drop of temperature at the bulb 30 the liquid therein will contract in volume, causing the end of the column in conduit 34 to move away from the chamber 29, 21 to decrease the pressure in said chamber 21, whereupon said chamber 21, either because of the inherent resiliency of the bellows 22 or of a suitable spring associated therewith, will contract, moving the valve member 25 with respect to its port 19 to increase the steam flow through the heat exchanger 13. Conversely, an increase of temperature at the bulb 30 effects a reverse operation and, if the temperature at the bulb 30 rises sufficiently high, the expansion of the liquid in the bulb 30 will cause liquid to be injected through the conduit 34 into the chamber 29, 21 where, by vaporization under the temperature of the chamber 21, the vapor pressure therein will expand said chamber to effect a closure of the port 19 by the valve member 25. However, as hereinafter explained, the high temperature control is to be effected by electrical means disposed in the space to be conditioned.

The control for the heat exchanger 13 as so far described also preferably, though not necessarily, includes compensating means for responding to the temperature of the air coming into the duct 11, as it is apparent that if the incoming air decreases in temperature more steam is required in the heat exchanger 13 to bring the air to the desired temperature, whereas if the temperature of the incoming air increases, less steam is required at the heat exchanger. In the form shown, a bulb 45 of any suitable size and construction is mounted in any suitable way in an aperture 46 in the wall of the duct so as to project interiorly of the duct to a position where it is responsive to the temperature of the incoming air. Communicating with said bulb 45 is a conduit 47 of any suitable size, length and construction which at its opposite end is in communication with the aforesaid chamber 29. Bulb 45 and conduit 47 are also charged with the same volatile liquid as used in bulb 30, chamber 32 and conduit 34. If the temperature of the incoming air decreases the liquid in the bulb 45 contracts, decreasing the pressure in the chamber 29, 21 so that, as before described, the valve member 25 moves away from its port 19 to increase the inflow of steam, whereas an increase in temperature at the bulb 45 increases the pressure in the chamber 29, 21 to thereby move the valve member 25 toward its port 19 and decrease the flow of steam.

In conformity with the present invention a predetermined relationship is maintained between the temperature in the space being conditioned and the temperature of the air flowing out of the duct 10, and to this end further means are provided for predetermining the flow of steam to the heat exchanger 13, this means also being associated with the chamber 29, 21 for varying the pressure therein. As shown, a third conduit 50 of any suitable size, length and construction is in communication with the chamber 29, 21 and, at its opposite end, with a bulb 51 of any suitable size and construction, bulb 51 and conduit 50 being also charged with the same volatile liquid as used in bulbs 30 and 45. Suitably associated with the bulb 51, and here shown as wrapped around the same, although such is not essential, is a heating coil 52 which at one end is connected by a lead 53 to one end of the secondary coil 54 of a transformer 55 whose primary 56 is connected by leads 57 with any suitable source of alternating current. The opposite end of heating coil 52 is connected by lead 65 to a variable resistance 58 that includes a movable member 59 for adjusting the resistance in the circuit, member 59 being connected by lead 60 to the opposite end of secondary 54. Extending from the heating coil 52 is a second lead 61 which is connected to the point 62 of a suitable thermostatic switch 63 that in turn is connected by lead 64 to the terminal of the secondary 54 to which lead 60 is connected. Thermostatic switch 63 may be of any suitable type and construction, and if desired it may be made adjustable, so that at a predetermined temperature it will engage the point 62 and discontinue the control of the resistance device 58, 59.

In operation, the heating coil 52 is continuously energized by the transformer 55, the generation of heat at said coil being predetermined by the amount of resistance introduced into the circuit 52, 53, 54, 60, 65 by the adjustable resistance 58, 59. The heating coil 52 effects an expansion of the liquid in the bulb 51, proportional to the extent of energization of the coil 52, whereby some of the charge in said bulb and conduit 50 is injected into the chamber 29, 21 to establish, by vaporization of the liquid therein, a predetermined vapor pressure that causes the valve member 25 to maintain a predetermined steam flow through the port 19, and thereby a predetermined heating of the air flowing through the duct 10. Therefore, while bulb 30 predetermines the minimum temperature of the air leaving the heat exchanger 13, bulb 51 under the control of its heating coil 52, as predetermined by the variable resistance 58, 59, predetermines the upper temperature of the air being delivered to the space to be conditioned. The control effected by the bulb 30, and by the bulb 45 when used, is thus superimposed upon the control effected from the bulb 51. If the temperature at the bulb 30 is below the predetermined minimum set up by the adjustment at chamber 32, the contraction of the liquid in bulb 30 causes a diminution of pressure in the chamber 29, 21 to increase the opening of the valve member 25 with respect to its port 19. Similarly, if the temperature of the incoming air drops so as to require the exchange of a large number of heat units, contraction of the liquid in the bulb 45 causes a diminution of pressure in the chamber 29, 21, also enlarging the opening of the valve member 25 with respect to its port 19.

If the temperature in the space being conditioned reaches the predetermined maximum temperature set for said space, the thermostatic switch 63, by snap action or any other suitable action depending upon the type of thermostatic switch used, moves to engage the contact 62 and thereby close the circuit 54, 64, 63, 62, 61, 52, 53, to discontinue the control of the variable resistance 58, 59. Thereby the heating coil 52 is brought to a higher degree of temperature, causing a predetermined expansion of the liquid in bulb 51 sufficient, by injection of the vaporizable liquid into the chamber 29, 21, to cause the expansion of said chamber 21 by the vapor pressure so generated, and thereby close the port 19 by valve member 25 to shut off the flow of steam.

Thus the electrical circuit as described cooperates with the control effected from the bulb 30 to establish a predetermined maximum temperature in the space being conditioned, so as to cut off the flow of steam when said temperature has been attained. Below said temperature the temperature in the space being conditioned is regulated by the extent to which the bulb 51 is heated by the heating coil 52 and which, in turn, is predetermined by the adjustable resistance 58, 59 in the circuit of said heating coil 52. Said adjustable resistance may be set as desired to predetermine the temperature to be maintained, and member 59 if desired may have associated therewith any suitable indicating device so as to facilitate the setting of the adjustable resistance. At the same time, the predetermined minimum temperature to be maintained in the air flowing out of the duct 10 is controlled from the bulb 30, because any drop in the air temperature below the predetermined minimum, as set by manipulation of the adjusting device 41, 42, is effective to decrease vapor pressure at the chamber 29, 21 to increase the steam flow until the predetermined minimum temperature of the air leaving the duct is reestablished. With the foregoing, the control effected by the bulb 45 when used constitutes a compensating control dependent upon the variations in temperature of the air flowing into the duct 10.

It is sometimes desirable to vary the temperature to be maintained in the space being conditioned in conformity with variations in the outdoor temperature because of the variations in gradient of temperature between the inside and the outside. The embodiment of Fig. 2 corresponds to the embodiment of Fig. 1 in all respects except that the variable resistance 58, 59 is here shown under the control of an outdoor thermostat. In Fig. 2, 70 designates any suitable support, as a portion of a wall of the space being conditioned, and mounted thereon in any suitable way is any appropriate thermostat subjected to the outdoor temperature and operatively connected to the movable member 59 of the variable resistance. As diagrammatically illustrated, 71 is any suitable bulb in communication through a suitable conduit 72 with an expansible and collapsible chamber 73 here shown as formed by a corrugated expansible and collapsible tubular wall or bellows having a stationary end wall 74 through which the conduit 72 extends and a movable end wall 75 provided with suitable means, as a rod 76, operatively connected to the movable member 59 of the variable resistance. The thermostat 71, 72, 73, is charged with any suitable thermosensitive fluid so that upon decrease in the temperature to which the bulb 71 is subjected contraction of chamber 73 is effected and, conversely, upon increase in the temperature to which the bulb 71 is subjected expansion is effected at chamber 73. Decrease in the outdoor temperature through contraction of the chamber 73 causes the movable resistance member 59 to move to the right as shown in Fig. 2, thereby increasing the resistance in the circuit that includes the heating coil 52 whereby the temperature of said coil is reduced. Reduction of the heating effect of the coil 52 causes a decrease in the vapor pressure derivable from the vaporizable liquid in the bulb 51 so that chamber 21 contracts to move the valve member 25 farther away from its port 19 and thereby increase the flow of steam to the heat exchanger 13. Conversely, an increase of temperature at the bulb 71 effects a decrease in the variable resistance 58, 59, causing the resistance coil 52 to increase in temperature and thereby maintain a higher vapor pressure in the chamber 29, 21 to decrease the flow of steam. In place of using an outdoor thermostat, the member 59 of the variable resistance may be automatically adjusted if desired by the thermostat being subjected to the temperature of the space being conditioned.

The embodiment of Fig. 3 corresponds to the embodiment of Fig. 1 except that it illustrates the use of a double-throw snap-action thermostatic switch subjected to the temperature of the space being conditioned instead of the single throw thermostatic switch, which may or may not be of a snap action type, as illustrated in the embodiment of Fig. 1. As here shown, the secondary 54 of transformer 55 is connected by lead 80 to any suitable double-throw snap-action switch member 81 that is thermostatically actuated and which moves between contact points 82 and 83. Point 82 is connected by lead 84 to the movable member 59 of the variable resistance 58, 59 having lead 86 to heating coil 52, while point 83 is connected by lead 85 to said heating coil 52. Under usual running conditions switch 81 is in contact with the point 82 so that current flows from the secondary 54 through lead 80, switch member 81, point 82, lead 84, variable resistance member 58, 59, lead 86, coil 52 and lead 53 to secondary 54. When the predetermined maximum temperature is reached, however, switch member 81 moves into contact with point 83, discontinuing the control of the variable resistance 58, 59 and connecting the secondary 54 directly to the heating coil 52 so as to effect closure of the steam valve in the manner hereinabove described.

It will therefore be perceived that the present invention provides an improved system whereby a predetermined minimum temperature for the air leaving the air duct may be set in advance while the temperature to be maintained in the space being conditioned may be nicely predetermined by setting the variable resistance 58, 59 so as to fix the normal running temperature to be maintained in said space. If the temperature in said space rises to the predetermined maximum, however, said system effects the closure of the steam valve so as to discontinue the heating of the air until the temperature in said space returns to a value below that set as the predetermined maximum, after which the normal running temperature is again maintained by the coaction of the heating coil 52 with the bulb 51. Thus a predetermined relationship may be maintained between the temperature of the air leaving the duct and the temperature in the space being conditioned, the values of these two temperatures being readily predetermined by adjustment of the minimum temperature of the air leaving the duct, through varying the response of the bulb 39 by manipulation of the adjustable means 41, 42, and predetermining the normal running temperature in the space being conditioned by adjusting the variable resistance 58, 59. The foregoing regulation may also include the compensation for variations in the temperature of the inflowing air through use of the bulb 45 as heretofore explained.

The present invention also enables the normal running temperature in the space being conditioned to be properly adjusted with respect to the variations in outdoor or indoor temperature as in the embodiment of Fig. 2. The thermostat responsive to the temperature of the space being conditioned may be of any suitable character and include either a double-throw snap-action switch as in the embodiment of Fig. 3 or a single-throw switch of any suitable type, whether snap acting or not, as in the embodiments of Figs. 1 and 2, it being expressly understood that the thermostat subjected to the temperature of the space being conditioned may be of any suitable type and made adjustable by any suitable provision known to the art so that this temperature may also be variably preset if desired. The system described is simple in construction, composed of parts that are inexpensive to fabricate and easy to install, and provides a regulation of temperature that is certain in action and highly efficient in operation.

While the embodiments of the invention illustrated on the drawings have been described with considerable particularity, it is to be expressly understood that the invention is not limited thereto, as the same may receive a variety of mechanical expressions, as will now be apparent to those skilled in the art, while changes may be made in the details of construction, arrangement, proportion, etc., parts may be replaced by equivalent parts, various other forms of thermostats, variable resistances, etc., may be employed than those diagrammatically illustrated in the drawings, and certain parts as the compensating control for the incoming air may be omitted if desired, without departing from the spirit of the present invention. Reference is therefore to be had to the appended claims for a definition of said invention.

What is claimed is:

1. In a temperature regulator for an air conditioning system of the type including an air duct, a heat exchanger therewith and means including a valve mechanism for supplying heating medium to said heat exchanger, the combination of an expansible and collapsible chamber operatively connected to the valve and having means associated with said chamber whereby said chamber is heated, a container for a vaporizable liquid in communication with said chamber and subjected to the temperature of the air leaving said heat exchanger, and means for predetermining the temperature to be maintained in the space to be conditioned including a second container for said volatile liquid in communication with said chamber, an electric heater associated with said last named container, an electric circuit connected to said heater, an adjustable resistance in said circuit for varying the temperature at said second container, and means responsive to a predetermined temperature in said space for discontinuing the control of said adjustable resistance and increasing the temperature of said heater.

2. In a temperature regulator for an air conditioning system of the type including an air duct, a heat exchanger associated therewith and means including a valve mechanism for supplying heating medium to said heat exchanger, the combination of an expansible and collapsible chamber operatively connected to the valve and having means associated with said chamber whereby said chamber is heated, a container for a vaporizable liquid in communication with said chamber and subjected to the temperature of the air leaving said heat exchanger, and means for predetermining the temperature to be maintained in the space to be conditioned including a second container for said volatile liquid in communication with said chamber, an electric heater associated with said last named container, a source of electric energy, an adjustable resistance, and switching means responsive to a predetermined temperature in said space arranged in one position thereof to connect said heater and said adjustable resistance in series to said source and in a second position to connect said heater directly to said source.

3. In a temperature regulator for an air conditioning system of the type including an air duct, a heat exchanger associated therewith and means including a valve mechanism for supplying heating medium to said heat exchanger, the combination of an expansible and collapsible chamber operatively connected to the valve and having means associated with said chamber whereby said chamber is heated, a container for a vaporizable liquid in communication with said chamber and subjected to the temperature of the air leaving said heat exchanger, a compensating thermostat including a container for said volatile liquid subjected to the temperature of the air flowing into said duct and also connected to said chamber, and means for predetermining the temperature to be maintained in the space to be conditioned including a third container for said volatile liquid in communication with said chamber, a heating coil associated with said third container, an electric circuit connected to said heating coil for continuously energizing the same means in said circuit for varying the temperature maintained by said coil, and means in said circuit for discontinuing the control of said last named means and increasing the temperature of said coil when a predetermined maximum temperature has been attained.

4. In a temperature regulator for an air conditioning system of the type including an air duct, a heat exchanger associated therewith and means including a valve mechanism for supplying heating medium to said heat exchanger, the combination of an expansible and collapsible chamber operatively connected to the valve and having means associated with said chamber whereby said chamber is heated, a container for a vaporizable liquid in communication with said chamber and subjected to the temperature of the air leaving said heat exchanger, and means for predetermining the temperature to be maintained in the space to be conditioned including a third container for said volatile liquid in communication with said chamber, a heating coil associated with said third container, an electric circuit including a variable resistance connected to said heating coil for varying the temperature at said third container, means responsive to the temperature exteriorly of said space for adjusting said variable resistance, and means responsive to a predetermined temperature in said space for discontinuing the control of said variable resistance and increasing the temperature of said heater.

5. In a temperature regulator for an air conditioning system of the type including an air duct, a heat exchanger associated therewith and means including a valve mechanism for supplying heating medium to said heat exchanger, the combination of an expansible and collapsible chamber operatively connected to the valve and having means associated with said chamber whereby said chamber is heated, a container for a vaporizable liquid in communication with said chamber and subjected to the temperature of the air leaving said heat exchanger, and means for maintaining a predetermined relationship between the temperature in the space to be conditioned and the temperature of the air leaving said heat exchanger including a second container for said volatile liquid in communication with said chamber, an electric heater associated with said second container, means associated with said heater for predetermining the temperature to be maintained thereby at said second container, and thermostatic means associated with said last named means for discontinuing the control of said last named means and increasing the temperature of said heater upon the occurrence of predetermined maximum temperature in said space.

6. In a temperature regulator including a valve for controlling the flow of heating medium, an expansible and collapsible chamber operatively conected to said valve for varying the flow of heating medium and means for predetermining the pressure in said chamber including a container for volatile liquid in communication with said chamber, a heating coil associated with said container, an electric circuit connected to said heating coil, a variable resistance in said circuit for varying the temperature at said container, a second source of said volatile liquid in communication with said chamber for predetermining the minimum pressure therein, and means for discontinuing the control of said variable resistance and increasing the temperature at said coil upon occurrence of a maximum temperature.

7. As a subcombination in a temperature regulator including a valve for controlling the flow of heating medium, an expansible and collapsible chamber operatively conected to said valve for varying the flow of heating medium and means for predetermining the pressure in said chamber including a container for volatile liquid in communication with said chamber, a heating coil associated with said container, an electric circuit connected to said heating coil, variable resistance in said circuit for varying the temperature at said container, and thermostatic means for discontinuing the control of said variable resistance and increasing the temperature at said coil upon the occurrence of a predetermined maximum temperature.

8. In a temperature regulator for an air conditioning system of the type including an air duct, a heat exchanger associated therewith and means including a valve mechanism for supplying heating medium to said heat exchanger, the combination of an expansible and collapsible chamber operatively connected to the valve and having means associated with said chamber whereby said chamber is heated, a container for a volatile liquid in communication with said chamber and subjected to the temperature of the air leaving said heat exchanger, and means for predetermining the temperature to be maintained in the space to be conditioned including a second container for said volatile liquid in communication with said chamber, a heater associated with said second container, means responsive to a temperature exteriorly of said space for controlling the supply of energy to said heater for predetermining the temperature to be maintained at said second container, and means responsive to the temperature in said space for terminating the control of said last named means and raising the temperature of said heater.

WILLIAM J. HAJEK.

REFERENCES CITED

The following references are of record in the file of this patent:

UNITED STATES PATENTS

| Number | Name | Date |
| --- | --- | --- |
| 1,794,530 | Newell | Mar. 3, 1931 |
| 2,044,427 | Giesler et al. | June 16, 1936 |
| 2,082,883 | Giesler et al. | June 8, 1937 |
| 2,171,803 | Parks et al. | Sept. 5, 1939 |
| 2,205,349 | Dube et al. | June 18, 1940 |
| 2,276,058 | Midyette | Mar. 10, 1942 |
| 2,290,153 | Barnes | July 21, 1942 |
| 2,355,043 | Adlam | Aug. 8, 1944 |